United States Patent [19]

Griffith

[11] 4,217,255

[45] Aug. 12, 1980

[54] COMPOSITION RAILROAD FRICTION MATERIAL WITH SYNTHETIC FIBER CONTENT

[75] Inventor: Arvon M. Griffith, Valley Cottage, N.Y.

[73] Assignee: Abex Corporation, New York, N.Y.

[21] Appl. No.: 30,411

[22] Filed: Apr. 16, 1979

Related U.S. Application Data

[63] Continuation of Ser. No. 815,637, Jul. 14, 1977, abandoned.

[51] Int. Cl.$^3$ .................... C08L 1/02; F16D 69/00
[52] U.S. Cl. ........................... 260/17.2; 188/251 R; 188/251 A; 260/17.4 BB; 260/17.4 CL; 260/38; 260/42.18
[58] Field of Search ............ 260/17.2, 17.4 CL, 38, 260/42.18

[56] References Cited

U.S. PATENT DOCUMENTS

| | | | |
|---|---|---|---|
| 3,684,062 | 8/1972 | Johnson | 188/251 R |
| 3,907,729 | 9/1975 | Burkey et al. | 260/17.2 |
| 3,922,241 | 11/1975 | Barker et al. | 260/17.2 |
| 3,959,194 | 5/1976 | Adelmann | 188/251 A |
| 3,967,037 | 6/1976 | Marzocchi et al. | 428/392 |

OTHER PUBLICATIONS

C.A. vol. 83: 61074n, Less Abrasive Composition Railroad Brake Shoe Material, Adelmann.
C.A. vol. 85: 165565f, Glass-fiber-based friction material, Sasahara.
C.A. vol. 79: 80031e, Fiber Strengthened Friction Material, Augustin.

*Primary Examiner*—Edward M. Woodberry
*Attorney, Agent, or Firm*—David A. Greenlee; Thomas S. Baker, Jr.

[57] ABSTRACT

Composition railroad friction materials having low wear rates are characterized by the use of synthetic fiber and by the absence of lead and asbestos. These friction materials are particularly suitable for use in railroad brake shoes and contain, by approximate weight, 0.5–11% non-asbestos fiber, of which at least 0.5% is synthetic fiber, 66–81% filler and 14–21% organic binder.

16 Claims, No Drawings

COMPOSITION RAILROAD FRICTION MATERIAL WITH SYNTHETIC FIBER CONTENT

This is a continuation of application Ser. No. 815,637, filed July 14, 1977, now abandoned.

This invention relates generally to composition type railroad friction materials and, more particularly, to such materials which feature the use of synthetic fibers and the absence of asbestos and lead.

BACKGROUND OF THE INVENTION

Most of the composition type railroad friction materials in use today include asbestos and lead. An example of this type of material is shown in U.S. Pat. No. 3,168,487—Spokes et al. Some environmentalists have warned of possible problems caused by the use of lead in friction materials. As a result, demand has developed for a lead-free friction material. Examples of some composition friction materials which exclude lead are U.S. Pat. Nos. 3,492,262—Griffith and 3,959,194—Adelmann. The former patent discloses a composition which has no lead and includes up to 16.5% by weight asbestos fiber, while the latter patent discloses some compositions which delete lead and have up to 11.1% by weight asbestos fiber.

More recently, certain environmentalists have pointed out that possible problems may be caused by the use of asbestos fiber in friction materials. Thus, it may be desirable to eliminate asbestos as well as lead from composition friction materials. U.S. Pat. No. 3,959,194 has some examples which utilize cellulosic fiber in a range of 3.5–8.0% by weight as a substitute for asbestos, although the patent is not concerned with eliminating asbestos in friction materials.

Asbestos has traditionally been used in friction materials because of its high heat resistance and strength and its low cost. A direct substitution of other types of fiber for asbestos is expensive, since other fibers cost much more than asbestos, and difficult, since no known fiber combines all of the desirable qualities of asbestos noted above. It is known to use high-content carbonized or graphitized fibers in aircraft friction materials, as shown in U.S. Pat. No. 3,552,533—Nitz. The use of glass fiber in friction materials is disclosed in several patents. U.S. Pat. No. 3,743,069—Barnett relates a clutch facing consisting almost entirely of bundles of continuous glass filaments. U.S. Pat. No. 3,627,606—Bentz teaches a glass-filament-reinforced fabric clutch facing impregnated with a cement containing lead (litharge). U.S. Pat. No. 3,713,934—Morton discloses a clutch facing composed of glass and asbestos. None of these friction materials would be suitable for railroad brake shoe use, since they are either too expensive and/or contain lead or asbestos.

It is, therefore, an object of this invention to provide lead-free, asbestos-free, high coefficient of friction, composition friction materials which feature a low fiber content including synthetic fiber and low wear rates.

SUMMARY OF THE INVENTION

I have discovered that railroad brake shoes that meet A.A.R. (Association of American Railroads) standards for brake shoes can be made from compositions having a low, non-asbestos fiber content which includes synthetic fiber. The friction materials according to this invention comprise, by weight, 0.5–11.0% non-asbestos fiber, including at least 0.5% synthetic fiber, 66–81% filler and 14–21% organic binder. A preferred embodiment of this composition friction material for railroad car use contains 2.7–3.5% synthetic fiber, 74–82% filler and 16–19% organic binder.

DETAILED DESCRIPTION OF THE INVENTION

The criterion for suitability of a composition friction material for railroad car brake shoe use is the ability of the friction material to pass the standards set forth in the A.A.R. Specification M-926-72, Feb. 13, 1973 Revision. Some of the pertinent dynamometer performance test criteria called for in this A.A.R. Specification are as follows:

1. Instantaneous Retarding Force During 45 Minute Dynamometer Drag Test:

| Drag | Retarding Force |
| --- | --- |
| Heavy load | 400 lbs. min. |
| Light load | 300 lbs. min. |

2. Static Coefficient of Friction:
   9 Test Average—0.38 min.
3. Stop Distances From 90, 70, 50, 30, 10 mph Under Light and Heavy Brake Shoe Loads (all stop distances must be within varying tolerances).
4. Wear Loss:
   Drag Tests (total)—0.60 in$^3$ max.
   Test Stops (total per sequence)—1.20 in$^3$ max.

As used herein, the term "synthetic fiber" means fiber made from a substance which does not naturally occur in a fibrous state and includes glass, polyester and kaowool. The term "synthetic fiber" excludes all forms of cellulose, which naturally occurs in a fibrous state, but which can also be processed into a different fibrous form (e.g., rayon). Some example mixes used a single type of synthetic fiber, while others used several types of synthetic fibers in combination. Other example mixes contained a mixture of synthetic and cellulose fibers. All mixes were totally free of asbestos and lead.

Organic binders, such as styrene butadiene rubber (SBR), nitrile butadiene rubber (NBR) and modified phenolic and cashew resins were used. Curing agents for the organic binders included sulfur, zinc oxide and hexamethylene tetramine.

A number of filler materials were used in varying combinations to produce the necessary low wear rate, hardness and high coefficient of friction. The fillers used were cast iron grit, kyanite, cashew nut particles, red iron oxide (hematite), black iron oxide, powdered alumina, graphite, barytes, coke, kaolin, cryolite, carbon black and zinc powder.

Examples of the mixes formulated and tested are shown below and denoted Mixes A-R. The compositions of ingredients are expressed in weight percentages:

|  |  | Weight % |
| --- | --- | --- |
| MIX A |  |  |
| Glass Fiber |  | 3.02 |
| Organic Binder |  | 18.63 |
| rubber | 15.74 |  |
| resin | 2.89 |  |
| Curative Agents |  | 1.64 |
| Filler Materials |  | 76.71 |
| iron grit | 12.11 |  |
| kyanite | 12.11 |  |

|  |  | Weight % |
|---|---|---|
| powdered alumina | 0.27 | |
| black iron oxide | 8.46 | |
| barytes | 21.21 | |
| coke | 22.55 | |
| MIX B | | |
| Glass Fiber | | 2.91 |
| Organic Binder | | 17.25 |
| rubber | 14.47 | |
| resin | 2.78 | |
| Curative Agents | | 1.62 |
| Filler Materials | | 78.22 |
| iron grit | 23.37 | |
| kyanite | 11.68 | |
| powdered alumina | 0.26 | |
| graphite | 7.90 | |
| barytes | 20.42 | |
| coke | 11.68 | |
| cryolite | 2.91 | |
| MIX C | | |
| Glass Fiber | | 1.61 |
| Organic Binder | | 16.98 |
| rubber | 12.03 | |
| resin | 4.95 | |
| Curative Agents | | 1.54 |
| Filler Materials | | 79.85 |
| iron grit | 24.54 | |
| kyanite | 13.99 | |
| powdered alumina | 0.48 | |
| graphite | 3.92 | |
| barytes | 17.11 | |
| coke | 14.99 | |
| cryolite | 4.82 | |
| MIX D | | |
| Glass Fiber | | 1.62 |
| Organic Binder | | 17.18 |
| rubber | 14.59 | |
| resin | 2.59 | |
| Curative Agents | | 3.08 |
| Filler Materials | | 78.13 |
| iron grit | 24.75 | |
| kyanite | 14.11 | |
| powdered alumina | 0.26 | |
| graphite | 7.65 | |
| barytes | 16.22 | |
| coke | 15.12 | |
| MIX E | | |
| Polyester Fiber | | 0.71 |
| Organic Binder | | 18.93 |
| rubber | 10.98 | |
| resin | 7.95 | |
| Curative Agents | | 1.24 |
| Filler Materials | | 79.11 |
| iron grit | 13.36 | |
| kyanite | 20.60 | |
| powdered alumina | 0.53 | |
| graphite | 8.73 | |
| barytes | 19.10 | |
| coke | 11.44 | |
| cryolite | 5.35 | |
| MIX F | | |
| Glass Fiber | | 3.20 |
| Organic Binder | | 19.74 |
| rubber | 16.68 | |
| resin | 3.06 | |
| Curative Agents | | 1.74 |
| Filler Materials | | 75.32 |
| kyanite | 12.84 | |
| hematite | 16.04 | |
| cashew particles | 1.28 | |
| powdered alumina | 0.28 | |
| graphite | 6.40 | |
| barytes | 22.44 | |
| coke | 16.04 | |
| MIX G | | |
| Glass Fiber | | 2.87 |
| Organic Binder | | 17.69 |
| rubber | 14.95 | |
| resin | 2.74 | |
| Curative Agents | | 1.56 |
| Filler Materials | | 77.90 |
| iron grit | 23.02 | |
| kyanite | 11.51 | |
| powdered alumina | 0.26 | |
| graphite | 5.74 | |
| barytes | 20.12 | |
| coke | 14.38 | |
| cryolite | 2.87 | |
| MIX H | | |
| Fiber | | 3.59 |
| glass | 3.06 | |
| cellulose | 0.53 | |
| Organic Binder | | 17.81 |
| rubber | 6.64 | |
| resin | 11.17 | |
| Curative Agents | | 2.39 |
| Filler Materials | | 76.22 |
| graphite | 6.99 | |
| barytes | 13.87 | |
| coke | 7.31 | |
| kaolin | 3.62 | |
| powdered alumina | 0.53 | |
| iron grit | 22.37 | |
| kyanite | 13.17 | |
| hematite | 8.36 | |
| MIX J | | |
| Fiber | | 2.16 |
| glass | 1.45 | |
| cellulose | 0.71 | |
| Organic Binder | | 17.82 |
| rubber | 15.06 | |
| resin | 2.76 | |
| Curative Agents | | 1.57 |
| Filler Materials | | 78.45 |
| kyanite | 11.59 | |
| powdered alumina | 0.26 | |
| iron grit | 23.19 | |
| graphite | 5.73 | |
| barytes | 20.26 | |
| coke | 14.48 | |
| cryolite | 2.89 | |
| MIX L | | |
| Fiber | | 3.32 |
| cellulose | 0.50 | |
| polyester | 0.33 | |
| kaowool | 2.49 | |
| Organic Binder | | 19.57 |
| rubber | 2.95 | |
| resin | 16.62 | |
| Curative Agents | | 2.65 |
| Filler Materials | | 74.48 |
| iron grit | 31.08 | |
| kyanite | 12.44 | |
| graphite | 6.70 | |
| barytes | 15.56 | |
| coke | 4.98 | |
| powdered alumina | 0.50 | |
| kaolin | 3.22 | |
| MIX M | | |
| Glass Fiber | | 3.24 |
| Organic Binder | | 16.97 |
| rubber | 9.46 | |
| resin | 7.51 | |
| Curative Agents | | 1.17 |
| Filler Materials | | 78.64 |
| iron grit | 24.71 | |
| kyanite | 14.09 | |
| powdered alumina | 1.01 | |
| graphite | 1.98 | |
| barytes | 16.81 | |
| coke | 10.26 | |
| cryolite | 4.86 | |
| carbon black | 4.92 | |
| MIX N | | |
| Glass Fiber | | 3.19 |
| Organic Binder | | 16.90 |
| rubber | 14.35 | |
| resin | 2.55 | |
| Curative Agents | | 1.60 |

|  | Weight % |
|---|---|
| Filler Materials | 78.31 |
| iron grit | 24.34 |
| kyanite | 13.88 |
| powdered alumina | 0.26 |
| graphite | 7.78 |
| barytes | 17.16 |
| coke | 10.11 |
| cryolite | 4.78 |
| MIX O | |
| Glass Fiber | 6.21 |
| Organic Binder | 16.99 |
| rubber | 4.92 |
| resin | 12.07 |
| Curative Agents | 3.79 |
| Filler Materials | 73.01 |
| iron grit | 31.12 |
| kyanite | 12.46 |
| graphite | 6.63 |
| barytes | 12.12 |
| coke | 7.62 |
| zinc powder | 3.06 |
| MIX P | |
| Fiber | 6.85 |
| glass | 6.34 |
| cellulose | 0.51 |
| Organic Binder | 17.36 |
| rubber | 5.02 |
| resin | 12.34 |
| Curative Agents | 2.40 |
| Filler Materials | 73.40 |
| iron grit | 31.75 |
| kyanite | 12.71 |
| graphite | 6.85 |
| barytes | 13.89 |
| coke | 5.08 |
| zinc powder | 3.12 |
| MIX R | |
| Fiber | 9.56 |
| glass | 3.18 |
| cellulose | 6.38 |
| Organic Binder | 18.32 |
| rubber | 10.21 |
| resin | 8.11 |
| Curative Agents | 4.51 |
| Filler Materials | 67.61 |
| iron grit | 26.67 |
| kyanite | 15.21 |
| barytes | 6.38 |
| coke | 11.17 |
| powdered alumina | 1.08 |
| carbon black | 7.10 |

The performance of these composition friction materials against the A.A.R. standards is shown below, where P=passed test and F=failed test:

TEST RESULTS-EXAMPLE MIXES

| Mix | Static Coeff. of Friction | Wear Loss (in³) Drag/Stops | Drag Tests Light Drag | Drag Tests Heavy Drag | Stop Distances Light BSL | Stop Distances Heavy BSL |
|---|---|---|---|---|---|---|
| A | .347 | .16/.33 | P | P | P | P |
| B | .514 | .09/.33 | P | P | P | P |
| C | .570 | .11/.26 | P | P | P | P |
| D | .480 | .23/.56 | P | P | P | P |
| E | .390 | .17/.57 | P | P | P | P |
| F | .563 | .33/.18 | P | P | P | P |
| G | .515 | .11/.33 | P | P | P | P |
| H | .397 | .23/.56 | P | P | P | P |
| J | .597 | .10/.32 | P | P | P | P |
| L | .494 | .17/1.03 | P | P | P | P |
| M | .457 | .15/.59 | P | P | P | P |
| N | .544 | .12/.31 | P | P | P | P |

All of the above mixes passed all of the A.A.R. performance tests, with the exception of Mix A which exhibited slightly low coefficients of friction. Mix L showed a relatively high wear rate, although within the A.A.R. standards.

It can be seen from the above test results that friction materials made from compositions including various synthetic fibers along, in combination with other synthetic fiber, or in combination with cellulose fiber can meet rigorous A.A.R. standards and exhibit low wear rates. The best wear rates were exhibited by Mixes A, B, C, G and N, which contained from 1.61-3.19% of a single synthetic fiber, and by Mix J which contained a low total content fiber mixture of synthetic and cellulose fibers.

Overall fiber content ranged from 0.71% polyester (Mix E) to 9.56% glass and cellulose (Mix R). Binder content ranged from 16.90% (Mix N) to 19.74% (Mix F), while filler content was from 67.61% (Mix R) to 79.85% (Mix C). The amount and type of curative agents is mainly dependent on the amount and composition of the organic binder used.

In summation, I have discovered that composition friction materials suitable for railroad use can be formulated, without the use of lead or asbestos, by using a relatively low content of various synthetic fibers alone, in combinations, or in combination with cellulose fiber.

I claim:

1. An asbestos-free and lead-free composition friction material, comprising, by weight, 0.5-11% fiber, of which at least 0.5% is synthetic fiber, 66-81% filler and 14-21% organic binder.

2. The friction material of claim 1, wherein the fiber content includes at least 1% glass fiber.

3. An asbestos-free and lead-free composition friction material, comprising, by weight, 1.5-10% fiber, of which at least 0.5% is synthetic fiber and at least 0.4% is cellulose fiber, 66-80% filler and 14-21% organic binder.

4. The friction material of claim 3, wherein the fiber content includes at least 1.5% glass fiber.

5. An asbestos-free and lead-free composition friction material, comprising, by weight, 5-10% fiber, of which at least 2.5% is synthetic fiber and at least 2.5% is cellulose fiber, 72-79% filler and 14-19% organic binder.

6. The friction material of claim 5, wherein the synthetic fiber is glass fiber.

7. An asbestos-free and lead-free composition friction material, comprising, by weight, 2-5% fiber, of which at least 1% is synthetic fiber and at least 0.5% is cellulose fiber, 72-82% filler and 14-21% organic binder.

8. The friction material of claim 7, wherein the synthetic fiber is glass fiber.

9. An asbestos-free and lead-free composition friction material, comprising, by weight, 0.5-7% synthetic fiber, 72-81% filler and 15-21% organic binder.

10. The friction material of claim 9, wherein the synthetic fiber is glass fiber.

11. An asbestos-free and lead-free composition friction material, comprising, by weight, 0.5-2% synthetic fiber, 74-82% filler and 15-22% organic binder.

12. The friction material of claim 11, wherein the synthetic fiber is polyester fiber.

13. An asbestos-free and lead-free composition friction material, comprising, by weight, 1.4-3.5% synthetic fiber, 74-82% filler and 16-21% organic binder.

14. The friction material of claim 13, wherein the synthetic fiber is glass fiber.

15. The asbestos-free and lead-free composition friction material, comprising, by weight, 2.7-3.5% synthetic fiber, 74-82% filler and 16-19% organic binder.

16. The friction material of claim 15, wherein the synthetic fiber is glass fiber.

* * * * *

UNITED STATES PATENT OFFICE
CERTIFICATE OF CORRECTION

PATENT NO. : 4,217,255
DATED : August 12, 1980
INVENTOR(S) : Arvon M. Griffith

It is certified that error appears in the above-identified patent and that said Letters Patent are hereby corrected as shown below:

Col. 4 (Mix J), line 34 - "5.73" should read --5.78--

Col. 6, line 5 - "along" should read --alone--

Signed and Sealed this

Twenty-eighth Day of October 1980

[SEAL]

Attest:

SIDNEY A. DIAMOND

Attesting Officer    Commissioner of Patents and Trademarks